Sept. 16, 1958  C. H. SCHAMEL  2,852,000
DUAL WINDSHIELD WIPER MOTOR SYSTEM
Filed Nov. 19, 1956  2 Sheets-Sheet 1

INVENTOR.
Clyde H. Schamel
BY
D. C. Staley
HIS ATTORNEY

Sept. 16, 1958     C. H. SCHAMEL     2,852,000
DUAL WINDSHIELD WIPER MOTOR SYSTEM
Filed Nov. 19, 1956                             2 Sheets-Sheet 2

INVENTOR.
Clyde H. Schamel
BY
D. C. Staley
HIS ATTORNEY

United States Patent Office 2,852,000
Patented Sept. 16, 1958

2,852,000
DUAL WINDSHIELD WIPER MOTOR SYSTEM

Clyde H. Schamel, Royal Oak, Mich., assignor to General Motors Corporation, Detroit, Mich., a corporation of Delaware Application November 19, 1956, Serial No. 622,980

12 Claims. (Cl. 121—114)

This invention pertains to the art of windshield cleaning, and particularly to a windshield cleaning system where each wiper arm and blade assembly is driven by an independent motor of the fluid pressure operated type.

Present day motor vehicles generally employ a single motor for actuating a pair of spaced wiper blade assemblies which are operated asymmetrically across the surface of a windshield. This arrangement requires either cable or rod connections between the single motor and the spaced wiper arm transmission assemblies. In the past, it has been proposed to employ a separate motor for each wiper arm and blade assembly, but no suitable means have been devised to effectively coordinate the movements of the two independent wiper motors. This invention pertains to a dual wiper motor system for a pair of spaced wiper blade and arm assemblies in which the wiper motors are coordinated at both ends of their strokes by a nonrigid fluid coupling thereby allowing flexibility in the location of transmissions without a complicated mechanical hookup. Moreover, it is pointed out that with the dual windshield wiper motor system of this invention no interconnecting mechanical means, such as links or cables, are required. Accordingly, among my objects are the provision of a windshield cleaning system including a separate wiper motor for each wiper arm and blade assembly; the further provision of a dual windshield wiper motor system including means for coordinating movements of the two motors at the ends of their strokes; and the still further provision of means for controlling a pair of fluid pressure operated motors so as to coordinate their movement.

The aforementioned and other objects are accomplished in the present invention by incorporating means in one motor for simultaneously controlling the application of fluid under pressure at the stroke ends of the other motor. Specifically, two embodiments of the present invention are disclosed herein, both embodiments being concerned with vacuum, or suction operated, motors. However, it is to be appreciated that this type of motor is disclosed only by way of example, and is not to be construed as a limitation since it is readily apparent that the motors could be of the positive fluid pressure operated type, either liquid or gas. In one embodiment, each motor includes a conventional automatic reversing valve mechanism which may be of the type disclosed in Patent Number 1,849,327, Hueber. In addition, each motor includes a second valve attached to and driven by the oscillatory paddle of its motor, which valve controls the admission of atmospheric air to the reversing valve of its companion motor at the stroke ends. In this manner, the admission of atmospheric air is coordinated to both motors at their stroke ends so as to effectively coordinate their movements.

In the second embodiment, the motors do not include automatic reversing valves of the type heretofore mentioned as are used in the first embodiment. On the other hand, the motors include snap-action valve assemblies which are actuated by oscillatory movement of the paddle through cam and spring toggle arrangements which control the application of atmospheric air pressure to the motors during their strokes. In addition, the second embodiment, each motor includes an air shut-off valve which controls the connection of its companion motor to atmospheric air at the stroke ends so as to coordinate movement of the motors.

Further objects and advantages of the present invention will be apparent from the following description, reference being had to the accompanying drawings wherein a preferred embodiment of the present invention is clearly shown and wherein similar numerals denote similar parts throughout the several views.

Figure 1:
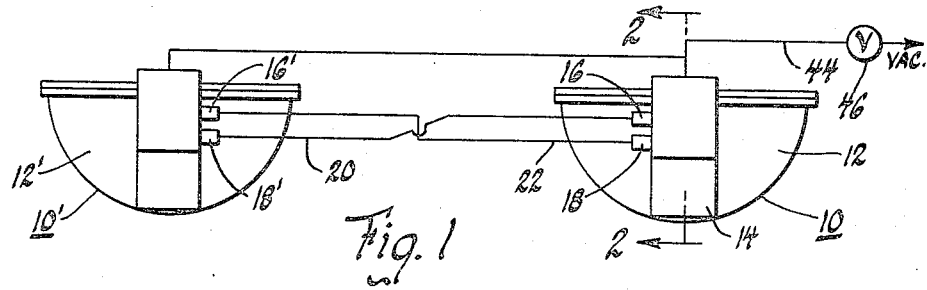
Figure 1 is a diagrammatic view indicating one embodiment of the dual windshield wiper motor system of this invention.

With particular reference to Figures 1 through 5, the first embodiment of the dual windshield wiper motor system will be described, and in this embodiment like parts of the two motors are indicated by like numerals with primes affixed. Thus, the dual windshield wiper motor system includes a pair of motors 10 and 10'. The motors include substantially arcuate housings, or cylinders, 12 within which oscillatable paddles, or pistons, not shown in Figure 1, are disposed. Each motor housing 12 has attached thereto a plate 14 which encloses a conventional reversing valve chamber containing an automatic valve of any desired type, such as shown in the aforementioned Patent Number 1,849,327. Each plate 14 has attached thereto a pair of nipples 16 and 18, and as shown in Figure 1 to effect asymmetrical movement of the companion motor, the nipple 16 on motor 10 is connected by conduit 20 with the nipple 18' on motor 10', while the nipple 18 is connected by conduit 22 with the nipple 16' on motor 10'.

Figures 2, 5:
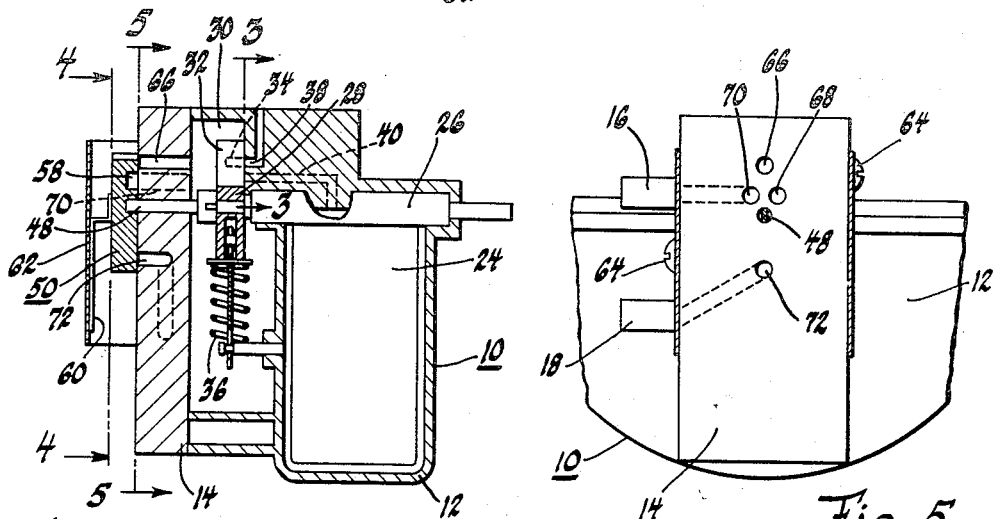
Figure 2 is an enlarged sectional view taken along line 2—2 of Figure 1.
Figure 5 is a fragmentary view in elevation taken along line 5—5 of Figure 2.
Figures 3, 4:
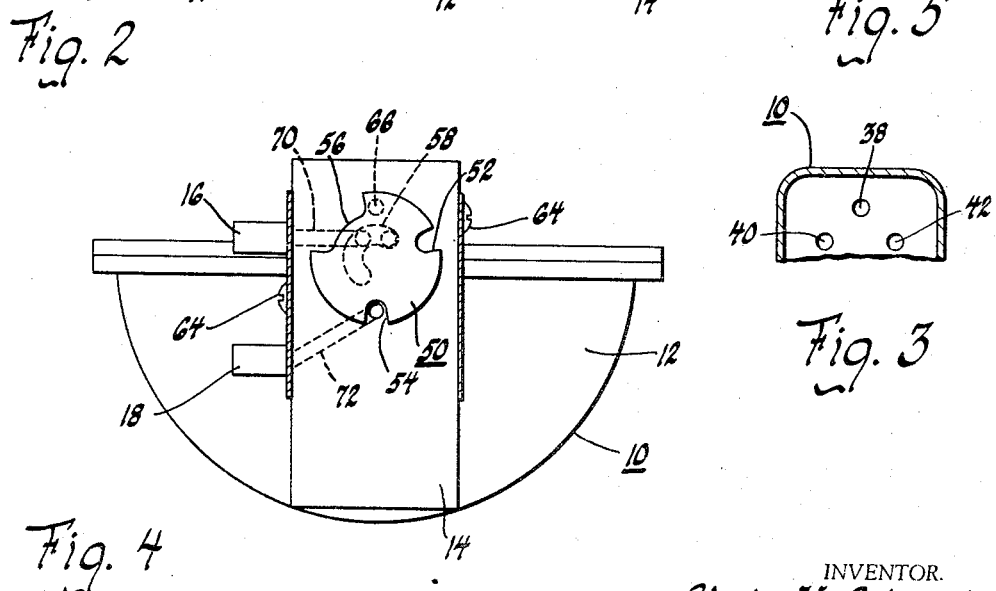
Figure 3 is a fragmentary view partly in section and partly in elevation taken along line 3—3 of Figure 2.
Figure 4 is a view partly in section and partly in elevation taken along line 4—4 of Figure 2.
Figure 6:
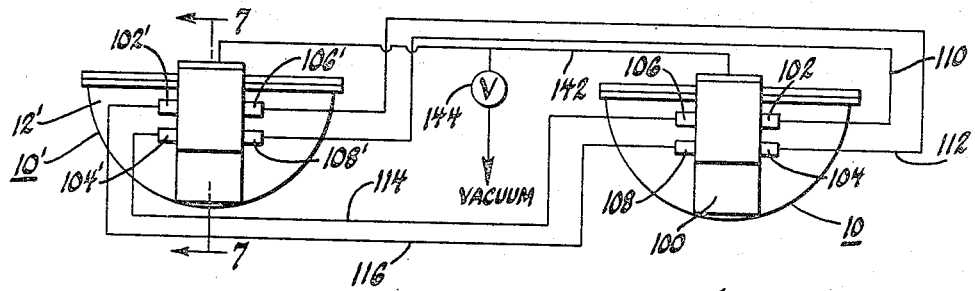
Figure 6 is a diagrammatic view of the second embodiment of the dual windshield wiper motor system constructed according to this invention.
Figure 7:
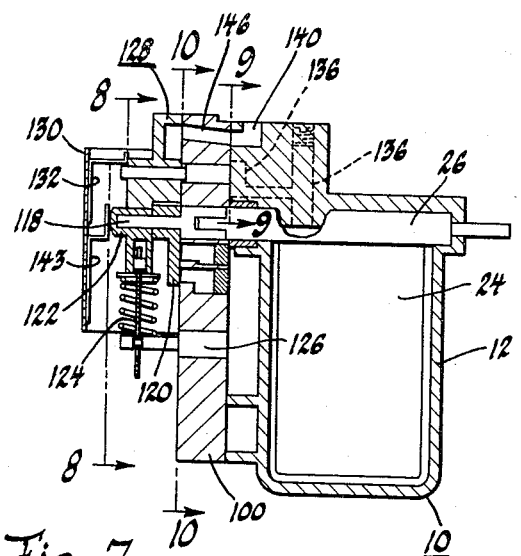
Figure 7 is an enlarged sectional view taken along line 7—7 of Figure 6.

Referring to Figure 2, since both motors are of identical construction, only one motor will be described in detail. Thus, the motor 10 has disposed within its housing, or cylinder 12, an oscillatable paddle 24 which is connected to a shaft 26 supported for oscillation within the housing 12. One end of the shaft 26 extends without the housing 12 and is adapted for connection to a wiper transmission, or pivot assembly, not shown, to which a wiper arm carrying a wiper blade may be detachably connected in accordance with conventional practice. The other end of the shaft 26 is drivingly connected with a cam 28 constituting a component of the automatic valve mechanism alluded to hereinbefore. This automatic valve mechanism is disposed within a valve chamber 30 and includes a valve member 32 having a kidney shaped slot 34 therein. The cam 28 is operatively associated with an over-center spring toggle 36, The purpose of the automatic reversing valve mechanism is to shift the application of subatmospheric pressure to one or the other sides of the paddle piston 24 in a manner well known in the art. Thus, as seen in Figure 3, the valve 32 having the kidney slot 34 connects a vacuum or subatmospheric pressure, port 38 with either port 40 or port 42. As seen in Figures 1 and 2, the vacuum port 38 of both motors is connected to a vacuum line 44 which may include a valve 46. The port 40 is connected to one chamber of housing 12 which is divided into two chambers by the paddle piston 24, while the port 42 is connected to the opposite motor chamber.

The shaft 26 also drivingly engages an adapter 48 in such a manner that the adapter 48 is oscillated with the shaft 26. The adapter 48 extends through the plate 14, the plate 14 being secured to the housing 12 by any suitable means, such as screw devices. An atmospheric air control valve 50 is attached to and driven by the adapter 48, the air controlling valve 50 having peripheral notches 52 and 54 as well as a peripheral arcuate groove 56. In addition, the valve 50 has an internal semicircular groove 58, as seen in Figure 4. The air controlling valve 50 is maintained in contact with the plate 14 by means of a leaf spring 60 which is attached to the plate 14 by a screw device 64.

With particular reference to Figure 5, the plate 14 is formed with through passages 66 and 68. In addition, the plate 14 is formed with passages 70 and 72, which communicate respectively with nipples 16 and 18. The passages 66 and 68 communicate with the valve chamber 30, which as hereinbefore mentioned, is sealed from atmospheric pressure by the plate 14 and is blocked from communication with the vacuum or subatmospheric pressure source, by valve 32.

Operation of the first embodiment of the dual windshield wiper motor system is as follows. When the vehicle operator opens the valve 46, subatmospheric pressure is communicated simultaneously by conduit 44 to ports 38 of both motors. With the air control valve in the position indicated in Figure 4, the paddle piston 24 is at the end of its counter-clockwise stroke, and ready to begin its clockwise stroke. Under these conditions, the valve 32 interconnects ports 38 and 40 so as to subject one side of the piston to subatmospheric pressure. The other side of the piston is connected through port 42 to the valve chamber 30. The valve chamber 30 of the motor 10 is connected through ports 58 and 56 to the nipple 16. The nipple 16 is connected by conduit 20 to the nipple 18' on the motor 10'. The nipple 18' on the motor 10' is, in turn, connected to passage 72' which is exposed to atmospheric pressure. Accordingly the pressure differential across the paddle piston 24 of the motor 10 is obtained from the vacuum source through its automatic reversing valve 32 and the air controlling port and passage 72' of the companion motor 10'. Conversely, with respect to the motor 10', one side of its piston is subjected to vacuum as controlled by its reversing valve 32', while the other side of the piston exposed to atmospheric pressure from nipple 16', conduit 22, nipple 18 and passage 72 in the plate 14 of the motor 10. As the paddle piston 24 of motor 10 moves in the clockwise direction, the valve 50 moves in the counterclockwise direction as viewed in Figure 4 so that the peripheral slot 54 closes the passage 72 while the arcuate groove 56 simultaneously opens the port 66. Thus, except for a slight movement adjacent the stroke end, initiating the clockwise stroke of the paddle piston, the atmospheric air supply of motor 10 is controlled by its port 66 which is connected to its valve chamber 30. When the paddle piston reaches the limit of its clockwise stroke, the automatic valve mechanism 32 will shift so as to interconnect ports 38 and 42, and at this time port 66 will again be closed while passage 72 will register with peripheral slot 52 so that the motor 10' will receive atmosphere air from the motor 10. Conversely, the motor 10 will receive atmosphere air from the motor 10'. In this manner, movement of the motors 10 and 10' is coordinated at their stroke ends since each motor receives its initial air intake through the conduit and valve means of its companion motor, which valve means are controlled by the respective motor piston and shaft assembly.

It is within the scope of this invention to provide conventional means for parking the motor pistons outside the normal wiping stroke when the valve 46 is closed. This may be accomplished by any suitable means well known in the art, such as shown in Patent Number 1,938,336, Horton et al.

With particular reference to Figures 6 through 10, the second embodiment of this invention will be described. In the second embodiment the motors 10 and 10' do not include the conventional automatic reversing valve mechanism as shown in the first embodiment. However, each motor has attached thereto a plate 100 having four nipples 102, 104, 106 and 108. In order to effect asymmetric movement of the motors 10 and 10', the nipple 102 of motor 10 is connected by conduit 110 to the nipple 108' of the motor 10'. Similarly, the nipple 104 of the motor 10 is connected to the nipple 106' of the motor 10' by conduit 112; the nipple 106 is connected by conduit 114 to the nipple 104' and the nipple 108 is connected by conduit 116 to nipple 102'.

As seen in Figure 2, each motor has a housing 12 with a paddle piston 24 therein which is connected to an oscillatable shaft 26. However, in this instance, shaft 26 is drivingly connected with adapter 118 which is journalled in the plate 100, the adapter 118 being drivingly connected with a lower air controlling valve 120 and a cam 122. The cam 122 is of conventional design and has associated therewith an over-center spring toggle assembly 124 which bears on a shaft 126. In this embodiment, each motor assembly includes an upper valve of the snap-action type, 128. The valve 128 is actuated by the cam 122 in a manner identical to that of the automatic reversing valve in the first embodiment. The valves 120 and 128 and the cam 122 are enclosed by a yoke 130 which has a pair of springs 132 and 143 engaging the valve 128 and cam 122 respectively. These springs maintain the two valves in tight engagement with the surface of plate 100.

Figure 9:
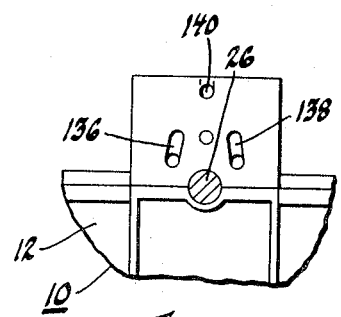
Figure 9 is a fragmentary view in elevation taken along line 9—9 of Figure 7.

With particular reference to Figure 9, the motor housing 12 is formed with passages 136 and 138 which communicate with the cylinder 12 on opposite sides of the piston 24. In addition, the motor housing 12 is formed with a passage 140 which communicates with conduit 142 having a valve 144 therein by which means conduit 142 can be connected to a source of subatmospheric pressure.

Figure 10:
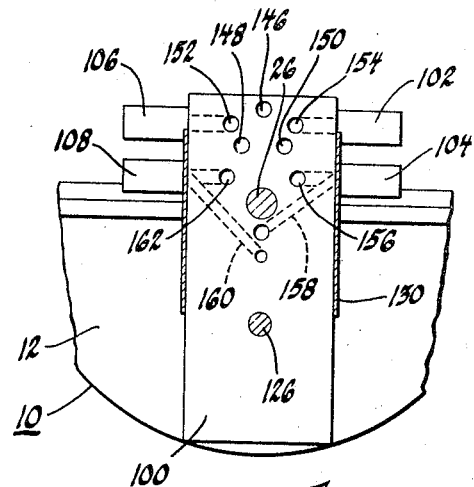
Figure 10 is a view in elevation taken along line 10—10 of Figure 7.

With particular reference to Figure 10, the plate 100 is formed with through passages 146, 148, and 150. The plate 100 also includes passages 152, 154, 156, 158, 160 and 162. The passage 152 communicates with the face of the plate 100 and also with nipple 106. The passage 154 connects with the face of plate 100 and with nipple 102. The passages 156 and 158 connect with the face of plate 100 and also with nipple 104, while the passages 160 and 162 connect with the face of plate 100 and nipple 108.

Figure 8:
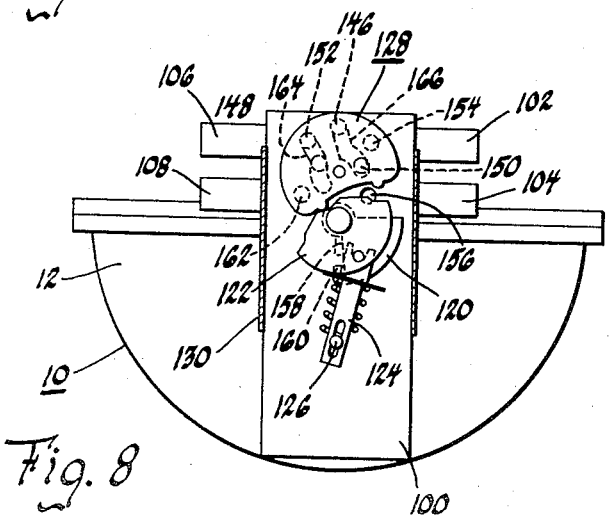
Figure 8 is a view partly in section and partly in elevation taken along line 8—8 of Figure 7.

Referring particularly to Figure 8, the upper valve 128 has a pair of partially linear, partially arcuate grooves 164 and 166. The lower valve 120 opens both passages 158 and 160 at the stroke ends of the motor piston. However, during the intermediate portion of the motor piston strokes, the passages 158 and 160 are closed by the valve 120. In one position of the valve 128, as depicted in Figure 8, the passage 156 is open, and the passage 162 is closed. Moreover, at this time the groove 164 interconnects passages 152 and 148 while the groove 166 connects passages 146 and 150. When the valve 28 is in the opposite position, the groove 166 interconnects passages 152 and 150 while the groove 164 interconnects passages 146 and 148. In addition, at this time the passage 156 is closed, while the passage 162 is open to atmosphere.

When the plate 100 is superimposed over the motor housing 12, the passage 146 in the plate 100 connects with the passage 140 in the housing 12. In addition, the passage 148 connects with the passage 136 in the housing 12 while the passage 150 in the plate is connected with the passage 138 in the housing 12.

Operation of the second embodiment is as follows. When the operator opens the valve 144, subatmospheric pressure is communicated simultaneously to passages 140 and 140' of the motors 10 and 10' respectively. Thus, subatmospheric pressure is communicated to passages 146 and 146' of the two motors. As shown in Figure 8, the valves 128 and 120 are in position to impart clockwise oscillation to the piston 24. Thus, passages 156, 158 and 160 are open to atmospheric pressure while passage 162 is closed by the valve 128. Air entering passages 156 and 158 through nipple 104 of motor 10 and the conduit 112 and thence into nipple 106' of the motor 10'. This air flows through nipple 106' to passage 152' and from passage 152' it is communicated by passage 148' to passage 136' in the housing 12 to one side of the motor piston. At this time the valve 128' of the motor 10' has connected the opposite side of the motor piston to subatmospheric pressure through passage 146' in the plate 100' and with the passage 166' in the valve 128', the passage 150', and passage 138'. Thus, motor 10' receives its initial air intake at the beginning of its clockwise stroke from the motor 10. Similarly, the motor 10 receives its initial air intake from the motor 10' through passage 136, valve groove 164, passage 152, nipple 106, conduit 114, nipple 104', and passages 156' and 158' of the motor 10'. Accordingly, both motor pistons will begin their clockwise strokes at the same time.

During the clockwise stroke of the pistons 24 and 24', the valve 120 closes ports 158 and 160 on the motor 10 and likewise the valve 102' closes ports 158' and 160' on the motor 10'. Thus, throughout the major portion of the stroke of motors 10 and 10', the atmospheric air is supplied through the passage 156 and 156' of its companion motor. When the piston approaches the ends of its clockwise stroke the over-center spring and cam assembly snap the valve 128 to its opposite position thereby starting both motors on their counterclockwise stroke at the same time. In this manner movement of the motor is coordinated at the stroke ends since the respective initial air intakes are obtained from the companion motor.

As in the first embodiment, the motors of the second embodiment may be provided with conventional parking ports and control valves to enable movement of the motor pistons so as to position the wiper blades outside the normal wiping range.

From the foregoing it is apparent that the present invention constitutes a unique arrangement for interconnecting two fluid motors so as to coordinate their stroke end movements without the use of a mechanical interconnection. In this manner, more power can be applied to each individual wiper arm and blade assembly so as to improve its operation under severe drag conditions.

While the embodiments of the invention as herein disclosed constitute preferred forms, it is to be understood that other forms might be adopted, as may come within the scope of the claims which follow.

What is claimed is as follows:

1. A windshield cleaning system including, a pair of fluid pressure operated motors, each motor having a chamber with a movable member therein, and a valve associated with each motor for controlling the operative application of fluid pressure to its companion motor, and means interconnecting said motors to effect concurrent movement thereof.

2. A windshield cleaning system including, a pair of vacuum motors, each motor having a cylinder with a piston therein, a valve driven by the piston of each motor for controlling the operative application of air to its companion motor at the stroke ends of piston movement, and means interconnecting said motors to effect concurrent movement thereof.

3. A windshield cleaning system including, a pair of fluid pressure operated motors, each motor having a chamber with a movable member therein, an automatic valve mechanism for each motor to control the operative application of fluid pressure thereto, and a second valve for each motor for controlling the operative application of fluid pressure to its companion motor at the stroke ends thereof.

4. A windshield cleaning system including, a pair of fluid pressure operated motors, each motor having a cylinder with a movable piston therein, automatic valve mechanism for each motor operable to control the application of fluid pressure to one or the other sides of said piston, and a second valve for each motor operative to control the application of pressure fluid to the opposite side of the motor piston in its companion motor so as to coordinate the stroke end movements of said motors.

5. A windshield cleaning system including, a pair of fluid pressure operated motors, each motor having a cylinder with an oscillatable piston therein, automatic valve mechanism for each motor to control the operative application of pressure fluid to one or the other sides of said piston, a second valve for each motor to control the operative application of pressure fluid to the opposite side of the piston adjacent the stroke ends of its companion motor, and means interconnecting said motors so that they will operate asymmetrically.

6. A windshield cleaning system including, a pair of vacuum wiper motors, each motor having a cylinder with a movable piston therein, a first valve associated with each motor for controlling the operative application of vacuum to either side of its motor piston, and a second valve associated with each motor for controlling the application of atmospheric air to its companion motor adjacent the stroke ends thereof.

7. A windshield cleaning system including, a pair of vacuum wiper motors, each motor having a cylinder with an oscillatable piston therein, automatic reversing valve mechanism for each motor to control the operative application of vacuum to either side of its respective motor piston, and a second valve for each motor operative to control the application of atmospheric pressure to the opposite side of the motor piston of its companion motor so as to coordinate the stroke end movement of said motors, the second valve of each motor being operative to supply its own motor with atmospheric pressure except adjacent the stroke end positions thereof.

8. A windshield cleaning system including, a pair of fluid pressure operated motors, each motor having a chamber with a movable member therein, a first valve for each motor to control the operative application of pressure fluid to opposite sides of the motor piston, and a second valve for each motor operative to control the application of pressure fluid to the opposite side of its companion motor throughout the entire stroke.

9. A windshield cleaning system including, a pair of fluid pressure operated motors, each motor having a chamber with a movable member therein, an automatic valve for each motor operative to control the application of pressure fluid to opposite sides of its respective motor chamber, a second valve for each motor operative to control the application of pressure fluid to the opposite chamber of its companion motor throughout the stroke of the movable member, and means interconnecting said motors so as to effect asymmetrical movement thereof and to coordinate their stroke end movement.

10. A windshield cleaning system including, a pair of fluid pressure operated motors, each motor having a cylinder with an oscillatable piston therein, a snap acting valve for each motor operative to control the application of fluid pressure to opposite sides of the motor piston, and a second valve driven by the oscillatable piston of each motor throughout its stroke for controlling the application of pressure fluid to the opposite motor side of its companion motor to coordinate movement of both motors.

11. A windshield cleaning system including, a pair of vacuum wiper motors, each motor including a cylinder having a movable piston therein, automatic valve mechanism associated with each motor for controlling the operative application of vacuum to opposite sides of its motor piston, and a second valve associated with each motor for controlling the operative application of atmospheric pressure to its companion motor to coordinate the stroke end movement of said two motors.

12. A windshield cleaning system including, a pair of vacuum motors, each motor having a cylinder with an oscillatable piston therein, a snap acting valve associated with each motor for controlling the operative application of vacuum to opposite sides of its motor piston, a second valve connected with each motor piston and movable therewith throughout its stroke for controlling the operative application of atmospheric pressure to its companion motor, and means interconnecting said motors to effect asymmetrical movement thereof.

References Cited in the file of this patent

UNITED STATES PATENTS

| | | |
|---|---|---|
| 2,258,010 | Horton et al. | Oct. 7, 1941 |
| 2,683,353 | O'Shei | July 13, 1954 |